T. G. RAKESTRAW.
STEAM TRAP.
APPLICATION FILED OCT. 2, 1915.

1,196,283.

Patented Aug. 29, 1916.
2 SHEETS—SHEET 1.

WITNESSES:
L. S. Woodhull
J. L. Duff.

INVENTOR
Thomas G. Rakestraw
BY
S. E. Thomas
ATTORNEY

T. G. RAKESTRAW.
STEAM TRAP.
APPLICATION FILED OCT. 2, 1915.
1,196,283.
Patented Aug. 29, 1916.
2 SHEETS—SHEET 2.
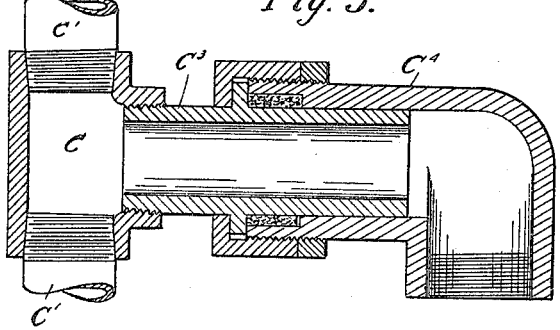
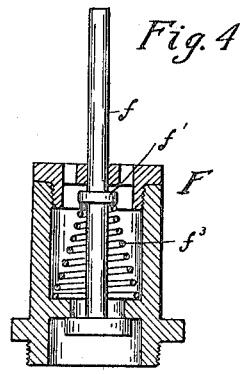
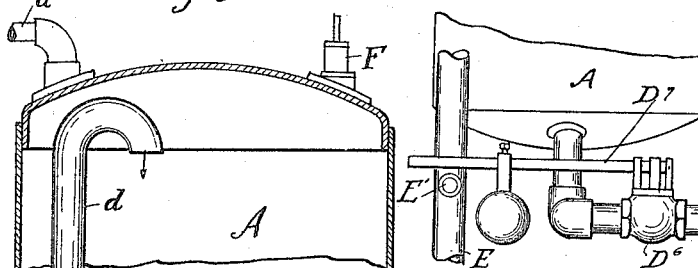
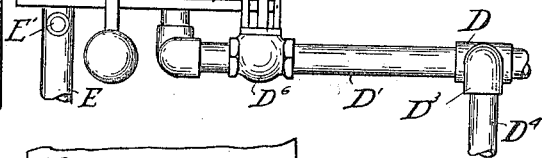
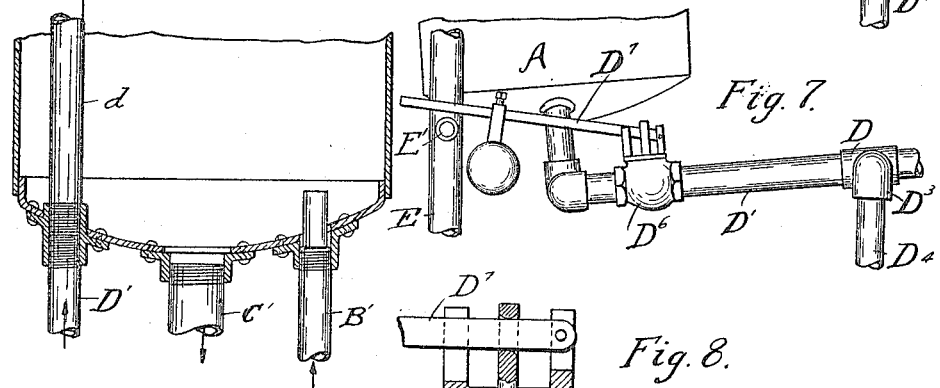
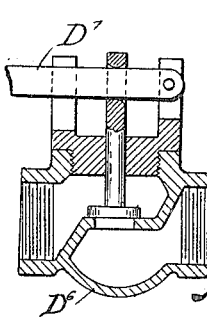
WITNESSES:
L. S. Woodhull
J. L. Duff
INVENTOR
Thomas G. Rakestraw
BY
J. E. Thomas
ATTORNEY

UNITED STATES PATENT OFFICE.

THOMAS G. RAKESTRAW, OF DETROIT, MICHIGAN.

STEAM-TRAP.

1,196,283.   Specification of Letters Patent.   Patented Aug. 29, 1916.

Continuation of application Serial No. 777,385, filed July 5, 1913. This application filed October 2, 1915.
Serial No. 53,858.

*To all whom it may concern:*

Be it known that I, THOMAS G. RAKESTRAW, citizen of the United States, residing at Detroit, county of Wayne, State of Michigan, have invented a certain new and useful Improvement in Steam-Traps, and declare the following to be a full, clear, and exact description of the same, such as will enable others skilled in the art to which it pertains to make and use the same, reference being had to the accompanying drawings, which form a part of this specification.

My invention relates to a combined water feed for boilers and steam trap of the tilting type, shown in the accompanying drawings and more particularly pointed out in the following specification and claim.

One of the objects of my invention is to provide an effective and inexpensive apparatus adapted to deliver water to the boiler from a feed water heater, or the condensation from a heating system.

Another feature of the invention consists in dispensing with the usual counterpoise weight employed in this type of apparatus to support the trap in position to receive the returns from the heating system, which when sufficient to overcome the action of the counterpoise weight causes the trap to tilt, thereby opening a steam valve by means of which boiler pressure is delivered to the trap. The trap being located above the boiler upon the steam entering it, the water passes by gravity to the boiler and when discharged the weight again becomes operative causing the tank to return to its initial position to again receive the returns from the heating system.

One object of the present invention is to dispense with the counterpoise weight referred to, and to provide a pair of receiving tanks connected together and supported upon trunnions in a suitable frame, the weight of the water delivered to the trap serving to alternately maintain one of the tanks in position to receive the feed water or the returns from a heating system while the other tank is delivering the water previously received to the boiler, thus providing for a rapid and practically continuous flow of water to one, or a battery of boilers as may be required.

Other advantages and improvements will hereafter appear.

Figure 2:
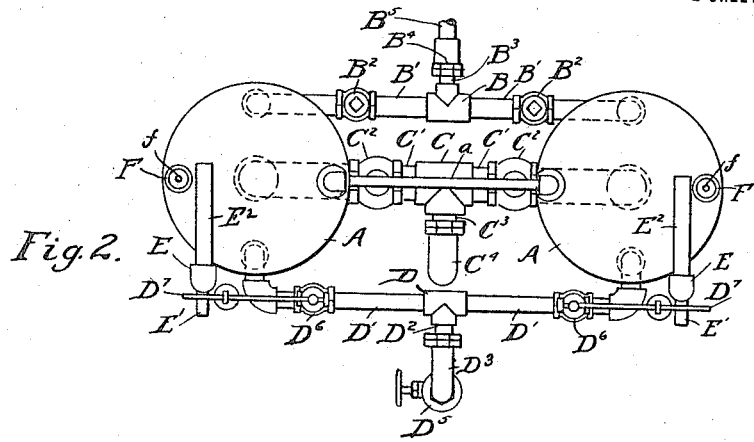
Figure 1:
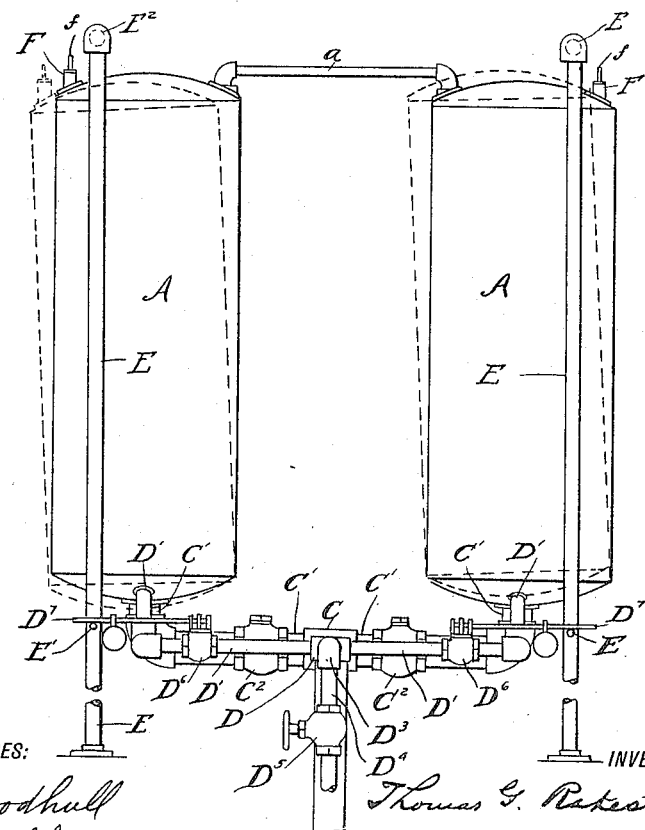

In the drawings accompanying this specification:—Figure 1 is a side elevation of the apparatus indicating in dotted lines the tanks in tilted position. Fig 2 is a plan view of the same. Fig. 3 is a detail sectional view of one of the trunnions and pipe connections. Fig. 4 is a detail sectional view through the relief valve. Fig. 5 is a sectional view through one of the receiving tanks with parts broken away showing the pipe connections leading to and from the tank. Fig. 6 is a fragmentary elevation of one of the tanks in its elevated position with the valve closed controlling the delivery of the steam thereto. Fig. 7 is an elevation of the tank in its tilted position showing the steam valve (actuated through its tilting action) open for the delivery of steam to the tank. Fig. 8 is a detail sectional view of the valve controlling the delivery of steam to the trap.

Referring now to the letters of reference placed upon the drawings: A, A, indicate a pair of tanks designed to be located above a boiler (not shown) and connected together by one or more tie rods or frame work $a$.

B, denotes a T from which extend the pipes B', B', leading to the respective tanks A, A, under control of check valves $B^2$, $B^2$, designed to alternately close preventing the delivery of water to the respective tanks and to retain boiler pressure within said tanks.

$B^3$, is a nipple (serving as a trunnion) extending from the T B, into a suitably packed connection $B^4$, carried by the pipe $B^5$, leading from a heating system or a feed water heater (not shown).

C, is a T, from which project pipes C', C', leading to the respective tanks A, A, under control of check valves $C^2$, $C^2$.

$C^3$, is a nipple extending from the T C, serving as a trunnion and connecting the nipple with a suitably packed joint $C^4$, carried by a pipe leading to the boiler (not shown).

D, is a T, from which extend steam pipes D', D', leading to the bottom of the respective tanks.

$d$, indicates a pipe within each of the tanks provided with a goose neck at its top and connected below with the respective pipes D', D'.

$D^2$, is a nipple extending from the T D, into a suitably packed connection $D^2$ and, carries the steam pipe D⁴, leading to the boiler.

The connections D³, C⁴, and B⁴, are in the same axial alinement and serve to support the trunnions of the tilting tanks.

D⁵, denotes a valve to control the delivery of steam from the boiler through the pipe B⁴.

D⁶, D⁶, are steam valves respectively located in the pipes D′, D′, each of which is provided with a weighted controlling lever D⁷, adapted to be automatically tripped by the arms E′, E′, projecting from the standards or frame E, when the trap is tilted in alternate directions.

F, denotes a suitable relief valve located at the top of each of the tanks. That shown being provided with a projecting stem $f$, having a collar $f'$, against which a spring $f^3$, bears to force the valve to its seat.

E², E², are arms extending from the frame E, over each of the tanks A, A, respectively, serving when the trap tilts to automatically trip the valve F, of the tank from which the water has been last discharged to relieve the boiler pressure therein that the returns from the heating system or the water from the feed heater may be again delivered to the tank.

Having thus indicated the several parts by reference letters, the construction and operation of the apparatus will be readily understood.

As previously indicated, the apparatus is located above the boiler and suitable connection made between the feed water heater or the returns from the steam heating system and the pipe B⁵, and also between the boiler and the joint C⁴, and the pipe D⁴. It will be assumed that the feed water heater or heating returns first enters the left hand tank, the weight of the same overcomes the weight of the right hand tank, the trap is caused to tilt as indicated in dotted lines in in Fig. 1,—and thereupon the lever D⁷, of the left hand valve D⁶, coming in contact with the projecting arm E′, carried by the frame E, is caused to tilt opening the valve delivering steam from the boiler through the pipe $d$, into the body of the left hand tank establishing therein boiler pressure. The water in the tank is now free to pass by gravity out through the left hand pipe C′, past the left hand check valve C², through the T C, and joint connection C⁴, to the boiler;—the boiler pressure holding the right hand check valve C², next to the elevated tank closed, in order that the water may only pass from the depressed tank to the boiler, as will be readily understood. It will now be assumed that the elevated or right hand tank has received a charge of condensation or feed water sufficient to overcome the weight of the depressed tank, thereby causing the apparatus to tilt in the opposite direction to that just described, which action will cause the steam valve D⁶, on the right hand side to open due to the lever D⁷, coming in contact with the arm E′, of the right hand standard, thereby delivering boiler pressure to the right hand tank, as in the previous case, thereby permitting the water in the right hand tank to flow by gravity to the boiler. The valve D⁶, connected with the left hand tank, however, will be closed through the action of its weighted lever, thus shutting off boiler pressure to the left hand tank, while the arm E′, on the left hand standard will depress the stem $f$, of the relief valve F, of the left hand tank against the action of the spring $f^3$, relieving the tank of boiler pressure previously delivered thereto, in order that condensation or feed water may again pass to the tank. Upon the water entering the pipe B⁵, it passes through the connection B⁴, and the T B, past the check valve B², of the then elevated tank, the opposite check valve B², being closed by the boiler pressure in the tank as before explained. The filling and discharging of the respective tanks and the operation of the valves are alternately repeated so long as the delivery of water to the boiler may be required or desired.

It will be seen that while the apparatus is simple and inexpensive in its construction, it provides for a practically continuous delivery of water from the feed water heater or of the returns from a heating system for one, or a battery of boilers.

While the several trunnions supporting the tanks are shown as separate fittings, it is obvious that a suitable casting may be employed providing the necessary connections for the several pipes leading to and from the tanks and thus simplify the assembling and proper alinement of the parts,—the construction shown in the drawings, however, has been found efficient and entirely practical.

Having thus described my invention, what I claim is:—

In an apparatus of the character described, a suitable frame including spaced uprights, a pair of tilting receiving tanks connected together and supported upon trunnions that they may tilt as a single unit, each tank having a relief valve and each upright having a lateral projection extending over the respective tank, suitable pipe connections to convey water to the respective tanks, check valves controlling the delivery of water through said pipes, pipe connections leading from the tanks to a boiler, check valves controlling said last named connections, a steam pipe connection between the boiler and each of the tanks, and steam valves adapted to be automatically opened and closed to govern the alternate delivery of steam through said pipe connection with the respective tanks actuated through the tilting of the trap upon alternate delivery of the water to the respective tanks and the relief
5 valves of the tanks being brought alternately into engagement with the respective lateral projections of said uprights to operate the relief valves.

In testimony whereof, I sign this specification in the presence of two witnesses.

THOMAS G. RAKESTRAW.

Witnesses:
SAMUEL E. THOMAS,
LAURA DUFF.

Copies of this patent may be obtained for five cents each, by addressing the "Commissioner of Patents, Washington, D. C."